Nov. 26, 1968    H. DIETRICH    3,412,511
DEVICE FOR TENSIONING AND ANCHORING STRESSING
MEMBERS OF A STRESSING CABLE
Filed Sept. 2, 1966    2 Sheets-Sheet 1
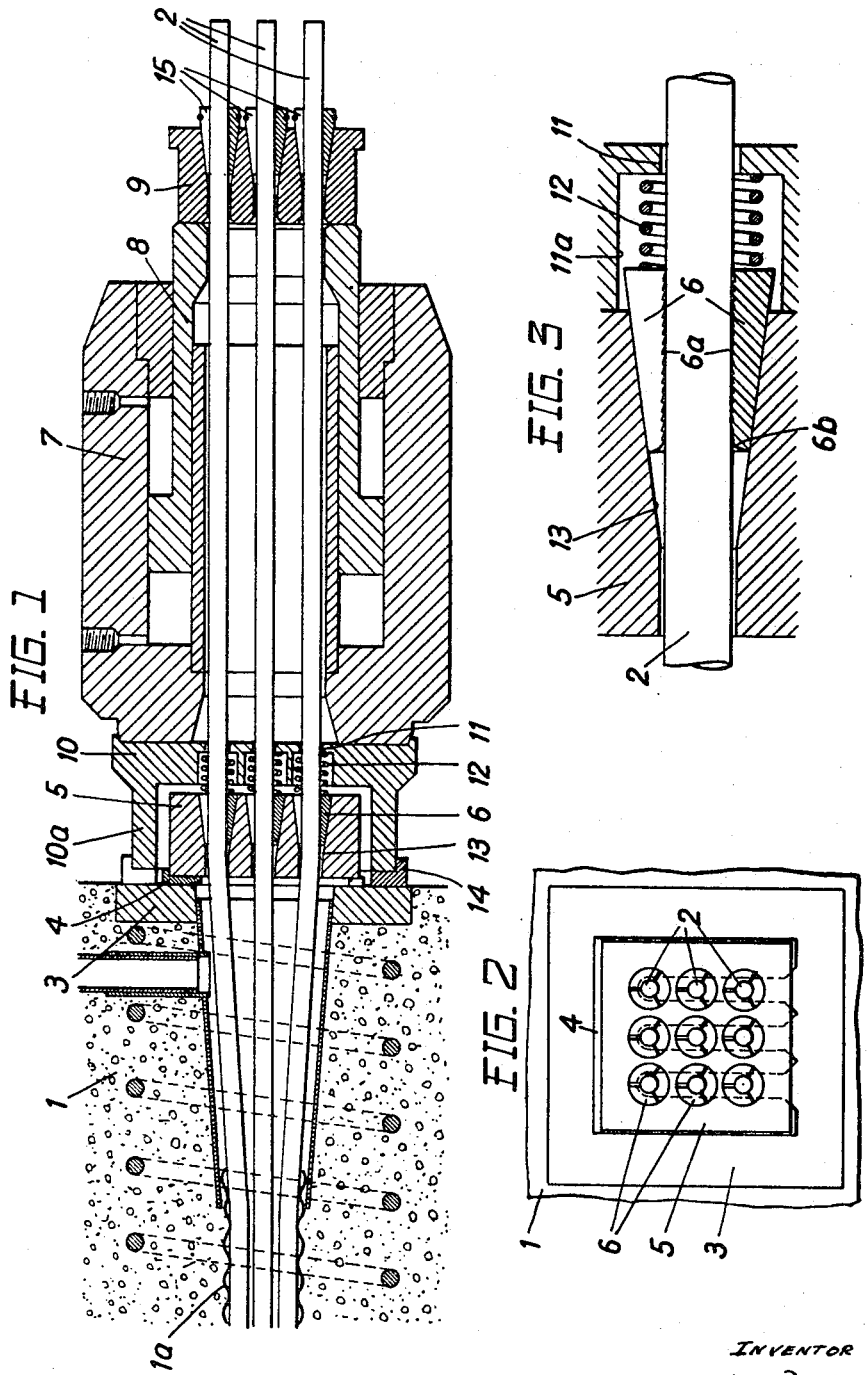
INVENTOR
HANS DIETRICH
By Brums, Schuyler, & Beveridge
ATTORNEYS

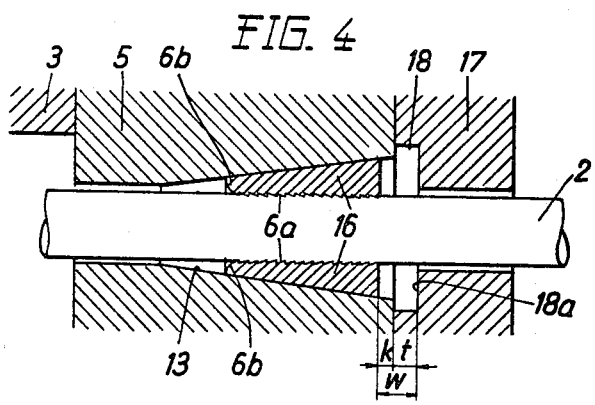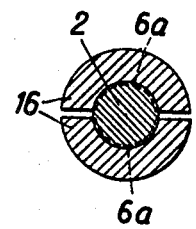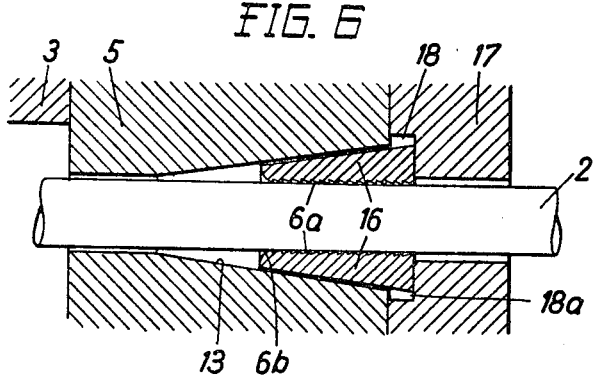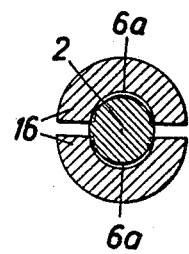

United States Patent Office 3,412,511
Patented Nov. 26, 1968

3,412,511
DEVICE FOR TENSIONING AND ANCHORING STRESSING MEMBERS OF A STRESSING CABLE
Hans Dietrich, Bern, Switzerland, assignor to Losinger & Co., A.G., Bern, Switzerland, a company of Switzerland (limited by shares)
Filed Sept. 2, 1966, Ser. No. 576,955
Claims priority, application Switzerland, Sept. 16, 1965, 12,848/65; May 25, 1966, 7,541/66
12 Claims. (Cl. 52—223)

ABSTRACT OF THE DISCLOSURE

An assembly for tensioning stressing members in a concrete structure, including an anchor head receiving the stressing members and having a plurality of wedge clamps engaged on the stressing members, a hold up member positioned adjacent the outer face of the anchor head and having means for uniformly limiting movement of the wedge clamps upon tensioning of the stressing members so that uniform slip results in the wedge clamps upon lessening of the tension, and a tensioning press mounted on the hold up member for simultaneously tensioning all the stressing members.

---

This invention relates to a device for tensioning and anchoring the stressing members of a stressing cable, the stressing members usually consisting of a wire, strand, or the like. This device basically comprises an anchor head provided with clamping means for anchoring the stressing members by wedging. As is well known, such devices are widely used in the technique of prestressed, post-tensioned concrete structures.

Devices of this kind are known in many designs. The development tends to use stressing cables with a great number of individual stressing members. Of course, so many stressing members cannot be arranged any more favorably in a ring. More complex arrangements in a stressing cable propose additional problems with regard to reliable anchoring of the individual stressing members in one and the same anchor head and in respect to the structural shape of the anchor head and the stressing equipment as well as in respect to the work to be carried through successively.

Lately an anchor head for a stressing cable consisting of a plurality of stressing members has been suggested where within an annular anchor head body, the stressing members are fixed in sections (by groups) by clamping effect, on the one hand by wedge elements which are supported by the body, and on the other hand by intermediate elements which extend between the groups. These intermediate elements are not tapered in longitudinal direction, but rather are indented or toothed like the wedge elements at the contact surfaces. There can be no doubt that such an anchor head fulfills its task reliably. However, in other respects it has several disadvantages. On the one hand, the manufacture alone of its various components it rather expensive. Moreover, auxiliary devices have to be provided, with the result that during the tensioning process the wedge and intermediate elements are prevented from being taken along by the stressing members when these elongate during the tensioning operation whereby they would leave their correct position within the anchor head body. Eventually, the wedge and intermediate elements must—by manually operated tools or by means of an auxiliary press attached to the tensioning press—be brought in a position in which a frictional contact with the stressing members exists to such an extent that on decrease of the pull exerted by the tensioning press on to the ends of the stressing members, the clamping anchoring takes place reliably.

The present invention has for one of its objects the provision of a tensioning and anchoring device of the type mentioned above, but which is free from the noted disadvantages.

Another object of the present invention is to provide such a tensioning and anchoring device which can be manufactured cheaply by the conventional methods and means.

A further object of the present invention is to provide such a device which is simply and quickly operable and yet very reliable.

A still further object of the present invention is to provide a tensioning and anchoring device which will uniformly stress the stressing members of a cable and which may also be employed to tension and anchor cables having various numbers of stressing members.

The foregoing and other objects are achieved by a device wherein the anchor head has uniform boreholes which are parallel to one another and conical in most part of their length. These boreholes run cylindrically at their narrow end for the guidance of the stressing members. The clamping means are comprised of externally conical uniform clamps which are arranged in the boreholes, assigned to the individual stressing members. These clamps are only movable to a limited extent in the direction of release and moreover are self-acting in the clamping direction as a result of friction contact with the stressing members.

In a preferred form of the invention, movement of the clamps in the direction of release is limited by a hold-up member directly in front of the anchor head and stationary with regard to same. This hold-up member is provided with bores constituting passageways for the individual stressing members and has in the vicinity of these bores a supporting surface on which the clamps directly rest during a tensioning (stressing) process.

This type is to be preferred to another one, in which between each clamp and a similar hold-up member a spring is arranged which endeavors to oppose a movement of the assigned clamp in the direction of release. Such springs, even if rather stiff ones, such as cup springs, are chosen, naturally allow a certain movement of the clamps with the stressing members and subsequently cause jumping back of the clamps. These to and fro movements succeed one another in an unforseen rhythm and thereby result at the time the anchoring process is to take place in variable positions of the clamps and in a variable slip for the associated stressing members during the anchoring process. Moreover, the type without springs is simpler and cheaper.

The invention will now be further described by way of example with reference to the accompanying drawings, in which:

FIGURE 1 is a longitudinal section of one embodiment of the tensioning and anchoring device, showing also a portion of a concrete structure and of a cable of stressing members with which the device cooperates to pre-stress this structure, the movable parts being shown in the position which they occupy when the last stage of the multi-stage tensioning process is terminated;

FIGURE 2 is an end-view of the anchor after this operation and after removal of those parts of the device which may then be used at another place;

FIGURE 3 is a longitudinal section of a portion of the device at an enlarged scale, the movable parts being shown in a position during one of the first stages of the tensioning process;

FIGURES 4 and 6 are section views similar to FIGURE 3, of a portion of an improved embodiment, FIGURE 4 showing the clamp in its active position, whilst FIGURE 6 shows this clamp in its relased position; and FIGURES 5 and 7 are cross-sectional views corresponding to FIGURE 4 and to FIGURE 6, respectively.

As shown more particularly in FIGURE 1, a concrete structure 1 has incorporated in it, as usual for prestressed, post-tensioned concrete structures, one or several channels each including a corrugated tube 1a. A prestressing cable consisting for instance of nine stressing members 2, is freely movable in its longitudinal direction up to the final injection of cement mortar. The stressing members 2 may consist each of a single wire or a wire strand. At the head end, a supporting plate 3 is embedded in the concrete structure 1. On this plate 3 rests, by means of a spacer plate 4 which has comb-like configuration (FIGURE 2) and which is inserted only at the last tensioning stage, an anchor head 5. The latter is a single or unitary member consisting of a square steel ingot, which has a number of parallel passages or bores 13 corresponding to the number of stressing members 2. These bores are conical in most part of their length, but run cylindrically at the narrow end next to the base plate 4 for the guidance of the stressing members 2. In the conical part of each bore 13 is a clamp 6, which is at its outside conical and at its inside 6a cylindrical; this clamp 6 consists, as illustrated in FIGURES 1 to 3 of three individual sections. The inner side 6a is indented and case-hardened for the improvement of its gripping power; at the slim end of each clamp 6 the indented inside merges into a rounded end 6b.

To the tensioning and anchoring device belongs also a hydraulic tensioning press of known construction, the stationary part of which (cylinder) is marked 7 and on the movable part 8 (piston) of which is resting a pull head 9. This pull head is a copy of the anchor head 5 and is also equipped with clamps. These clamps are similar to the clamps 6, but are marked 15.

In the equipment shown in FIGURES 1 to 3 there is also a hold-up member 10 which is provided for its support on the supporting plate 3 with a ring-shaped added portion 10a which is a means supporting the stationary part (cylinder) 7 of the tensioning press during a tensioning process. This hold-up member 10 has staggered bores 11 forming passageways for the stressing members 2, and is equipped with pressure springs 12; the latter are in the wider part 11a of the staggered bores 11 and project somewhat out of the latter. As shown in the drawings, hold-up member 10 is comprised of a single or unitary member.

The tensioning and anchoring process is carried out in a plurality of stages. In all tensioning stages, with the exception of the last one, the tensioning press 7, 8 rests, during the actual tensioning phase, on the supporting plate 3 and the concrete structure 1, by means of the hold-up member 10.

Every time when in such a tensioning phase the movable part 8 of the tensioning press together with the pull head 9 and the adjacent end portions of the stressing members 2 covers the first part of its tensioning stroke the clamps 6 leave their position of action; however, since they remain under the pressure of their individually assigned springs 12 they stay in frictional contact with the corresponding stressing member until the entire tensioning stroke of the tensioning stage in question is covered. Therefore the clamps 6 are automatic, which entails that every time when in the second phase of such a tensioning stage the pull, effected by the tensioning press on to the ends of the stressing members, is reduced, these clamps 6, owing to their continuous frictional contact with the stressing members, return immediately to their position of action by retracting into the conical part of the anchor head bore 13; the retraction is known as "retraction-slip" and has to be taken into account beforehand.

Before the tensioning in the last stage, a horseshoe-shaped flat spacer 14 is inserted between the hold-up member 10 and the supporting plate 3; the thickness of this spacer is at least equal to the size of said retraction slip.

In the tensioning process of the last stage the anchor head 5 with the stressing members 2, which remain anchored therein, is lifted from the supporting plate 3 only so much that the width of the thus formed gap renders possible the placing of the spacer plate 4 through the opening of the above-mentioned horseshoe-shaped spacer 14. As soon as the spacer plate 4 is placed and subsequently the pull effected by the tensioning press is reduced, the anchor head 5 comes at once to rest by means of the spacer plate 4 on the supporting plate 3, and the whole tensioning and anchoring process is finished. The pull head 9, the tensioning press 7, 8, the hold-up member 10 with springs 12 and the horseshoe-shaped spacer 14 can be removed and used in another place. The thickness of the spacer plate 4 is chosen according to the size of the retraction slip of the clamp 6. This retraction slip is therefore abolished by this last tensioning stage.

After the conventional injection of cement mortar into the channel including the tube 1a and the hardening of this mortar the stressing members 2 can be separated in the usual manner at about the spacer plate 4 with the fusing burner; the anchor head 5 and the appertaining clamps 6 can also be used repeatedly.

Considerations confirmed by practical experience show that each clamp 6, which is subject to the effect of the assigned spring 12, moves alternately at a tensioning and anchoring process under frictional contact with the assigned stressing member away from the position of action and then jumps back under spring pressure towards the position of action; the amplitude of this movement to and fro depends on the strength and stiffness of the springs 12 and the frictional contact between clamp and stressing member; if the clamp had been in action once and is being released in a second or further tensioning stage (with the exception of the last one) the frictional contact will be specially intense at first, as it is intensified by form-locking of the teeth 6a. Therefore, when the stressing members 2, which together form a stressing cable, cover together the tensioning stroke of a tensioning stage, the clamps 6 execute in a casual and non-synchronized rhythm the movements to and fro and, therefore, at the moment that the stressing members have covered the provided tensioning stroke, they are at different distances from their position of action (clamp position) and therefore cover a different long "retraction way" at the subsequent retraction; thus "retraction slips" of different length result for the individual stressing members. With regard to the whole tensioning stroke these differences are so small that they can be accepted in most cases.

FIGURES 4 to 7 show an improved and even simplified embodiment according to this invention, at which such differences do not appear any more. This result is obtained by two measures, namely, (1) the clamps, marked in FIGURES 4 to 7 with 16, are separated in two halves only along a diametral plane; and (2) the springs 12 are omitted and therewith the stroke $w$ which the clamps 16 cover at the beginning of a tensioning process, starting from their position of action (FIGURE 4) until they rest on the flat bottom surface 18a of a recess 18, arranged in the holdup member 17, is so determined that the clamps 16, when released from the position of action during the tensioning process, are resting on the surface 18a and, as shown in FIGURE 7, they are still with a part of their circumference in frictional contact with the respective stressing members. The stroke $w$ is composed of the dimension $k$ by which the clamps 16, in their position of action, are set back behind the exterior front surface of the anchor head 5, and the depth $t$ of the recess 18. If $k=o$ is chosen, then $t=w$ is to be chosen.

On the one hand, the automatic action of the clamps is guaranteed by these measures, on the other hand, it is due to these measures that the retraction depth or retraction slip for each stressing member has a predetermined value. Provided that the bores 13 in the anchor head 5 as well as the clamps 16 are uniform, the stressing members have a uniform diameter and the depth $t$ is throughout the same, a uniform retraction slip results for all stressing members of a stressing cable.

In addition to the above-noted advantages, it will also be seen that the device of the present invention is relatively compact and thereby particularly adaptable to the close spacing of cables in prestressed structures. Additionally the anchor head of the subject device undergoes relatively little movement in the stressing direction even when the cable and the tensioning elongations are of great length. This factor further permits the overall size of the device to be reduced. It will further be appreciated that the device of the present invention with its automatic clamps, is especially suitable to a multi-stage or step-by-step tensioning process.

Other modifications readily apparent from tthe foregoing description and associated drawings, although not specifically mentioned herein, will nevertheless be included within the spirit and scope of the invention as indicated in the appended claims.

I claim:

1. An assembly for tensioning and anchoring a plurality of elongated stressing members of uniform diameter in a concrete structure or the like; the assembly comprising in combination, support means at the face of the concrete structure extending around the stressing members, an anchor head having a unitary construction including opposite faces with one face abutted against said support means, said anchor head having a plurality of uniform passages extending between said faces thereof and receiving said stressing members respectively, said passages including uniform conical portions opening outwardly into the other face of said anchor head, a plurality of uniform wedge clamps received in said conical portions about said stressing members with internal surfaces of said wedge clamps in frictional engagement with said stressing members, a hold-up member having a unitary construction including a plurality of passages receiving said stressing members, means supporting said hold-up member with respect to said support means in a position adjacent said other face of said anchor head and with the passages in said hold-up member aligned with the passages in said anchor head, and means provided in said passages of said hold-up member for limiting movement of said wedge clamps out of the passages in said anchor head upon tensioning of said stressing members.

2. The assembly defined in claim 1 further including a tensioning press means for simultaneously tensioning all of said stressing members with equal force, said tensioning press means having one end abutted against said hold-up member with the hold-up member located between said anchor head and said tensioning press means.

3. The assembly defined in claim 2 wherein said means for limiting movement of said clamps includes compression springs received in said passages of said hold-up member and about the stressing members respectively with the ends of the springs engaged against portions of said hold-up member and the opposite ends engaged against said clamps respectively.

4. The assembly defined in claim 3 wherein said clamps each comprise three equally-angularly spaced sections engaged about the associated stressing member.

5. The assembly defined in claim 2 wherein said tensioning press means includes a fluid motor having an outer fixed casing abutted against said hold-up member and an internal movable casing receiving said stressing members.

6. The assembly defined in claim 1 wherein said passages in said hold-up member are dimensioned to receive portions of said clamps upon tensioning of said stressing members, and said means for limiting movement of said clamps includes abutment surfaces located in said passages respectively to engage said clamps and thereby limit their movement upon tensioning of said stressing members, said abutment surfaces in said hold-up member being coplanar and equally spaced from said other face of said anchor head such that said clamps undergo the same amount of limited movement upon tensioning of said stressing members whereby upon lessening of the tension thereon, the stressing members undergo uniform slip and will be uniformly stressed.

7. The assembly defined in claim 6 wherein said support means includes a first spacer means positioned between said anchor head and said concrete structure and a second spacer means positioned between said hold-up member and said concrete structure.

8. The assembly defined in claim 6 wherein said clamps each comprise two half sections engaged about the associated stressing member.

9. The assembly defined in claim 8 wherein the internal surfaces of said clamp sections are formed with teeth to enhance engagement with the stressing members.

10. An assembly for tensioning and anchoring a plurality of stressing members of uniform diameter in a concrete structure or the like; the assembly comprising in combination, a unitary anchor head having opposed faces with one face in abutting engagement with the concrete structure, said anchor head having a plurality of uniform passages extending between said faces thereof and respectively receiving said stressing members, said passages having uniform conical portions opening outwardly into the other face of said anchor head, a plurality of uniform wedge clamps respectively received in said conical portions and having internal surfaces in frictional engagement with the stressing members, a unitary hold-up member positioned adjacent said other face of said anchor head and having a plurality of passages respectively receiving said stressing members, said hold-up member having a plurality of fixed abutment means equally spaced from said other face of said anchor head and in alignment with said wedge clamps to uniformly limit movement of said wedge clamps relative to the anchor head upon tensioning of said stressing members whereby upon lessening of the tension on the stressing members, the wedge clamps will undergo uniform slip and the tension on the stressing members will consequently be uniform.

11. The assembly defined in claim 10 wherein said passages in said hold-up member each includes a narrow portion dimensioned to freely receive a stressing member and an enlarged portion dimensioned to receive an associated clamp, and wherein said abutment means are shoulders formed between the narrow and enlarged portions of said passages.

12. The assembly defined in claim 10 further including tensioning press means supported on the hold-up member for simultaneously tensioning the stressing members with equal force.

References Cited

UNITED STATES PATENTS

| | | | |
|---|---|---|---|
| 3,137,971 | 6/1964 | Rhodes | 52—230 |
| 3,163,904 | 1/1965 | Ziolkowski | 24—126 |

HENRY C. SUTHERLAND, *Primary Examiner.*

JAMES L. RIDGILL, JR., *Assistant Examiner.*